United States Patent [19]

Vandervelde et al.

[11] Patent Number: 4,997,568

[45] Date of Patent: Mar. 5, 1991

[54] PROCESS AND APPARATUS FOR A BIOLOGICAL REACTOR TO PURIFY WATER

[76] Inventors: Don M. Vandervelde, 5409 Huntwick Dr. NW., Gig Harbor, Wash. 98335; Glenn J. Helm, 1616 NE. Dawn Rd., Bremerton, Wash. 98310

[21] Appl. No.: 404,894

[22] Filed: Sep. 8, 1989

[51] Int. Cl.$^5$ .............................................. C02F 3/30
[52] U.S. Cl. .................................. 210/603; 210/605; 210/617; 210/150; 210/170; 210/252; 210/261; 210/283; 210/290
[58] Field of Search ............... 210/610, 617, 631, 150, 210/151, 252, 261, 265, 283, 290, 311, 170, 603, 605

[56] References Cited

U.S. PATENT DOCUMENTS

| | | | |
|---|---|---|---|
| 212,023 | 2/1879 | Maeurer | 210/252 |
| 690,333 | 12/1901 | Wanner, Jr. | 210/283 |
| 699,345 | 5/1902 | Provost, Jr. | 210/151 |
| 1,738,521 | 12/1929 | Bomhoff | 210/265 |
| 3,123,556 | 3/1964 | Gilbert | 210/151 |
| 3,126,333 | 3/1964 | Williams | 210/151 |
| 3,933,629 | 1/1976 | Smith | 210/150 |
| 3,950,252 | 7/1976 | Jordon | 210/170 |
| 4,162,976 | 7/1979 | Monson | 210/261 |
| 4,211,655 | 4/1980 | Jordon | 210/170 |
| 4,293,421 | 11/1981 | Green | 210/170 |
| 4,311,593 | 1/1982 | Benjes et al. | 210/610 |
| 4,670,148 | 6/1987 | Schneider | 210/747 |
| 4,800,021 | 1/1989 | Desbos | 210/150 |

FOREIGN PATENT DOCUMENTS 18216 10/1892 United Kingdom .

Primary Examiner—Richard V. Fisher
Assistant Examiner—Christopher Upton

[57] ABSTRACT

A system and method to remove pathogenic organisms and other suspended and dissolved containments from sewage or other contaminated water by an inexpensive, nearly maintenance free device. Principles of operation include new effective methods whioch combine synergistically, suspended and fixed film biological reactor, settling chamber, physical filter, and composting technology, to achieve tertiary sewage treatment and equivalent treatment of other contaminated water without outside energy input being required. Contaminated water flows into the apex or center of a large circular, wedge or conic chamber, then radially through precisely shaped layers of medium which provide progressive treatment by reduced pore size and increased surface area as the flow proceeds to the periphery. Oxygen can be diffused into the final treatment stage by providing large surface exposure to ambient air. The treated effluent has a benign health and aesthetic quality to permit disposal as normal surface run-off, used for irrigation and landscaping or allowed to percolate into subsurface soil without clog mat formation.

10 Claims, 3 Drawing Sheets

PROCESS AND APPARATUS FOR A BIOLOGICAL REACTOR TO PURIFY WATER

BACKGROUND OF THE INVENTION

This invention involves a substantial departure from current art, using natural forces to purify sewage or other tainted water by impounding it under conditions which permit those forces to work with unique effectiveness. When the water is sufficiently pure, it can be reused or released benignly into the hydrological cycle.

The increasing knowledge of the vulnerability and importance of clean water supplies require that sewage and other contaminated waste water not be dumped into the environment without treatment to mitigate or eliminate its adverse impact. The use of contaminated water for processing and/or household may also require pretreatment or purification.

Historically, water purification has taken advantage, in some cases, of aerobic or anaerobic biological devices to produce improved effluent using biota fixed on a substrate, or suspended. Anaerobic devices have traditionally been limited to a maximum of about 70%–80% treatment and proposed as polishing stages prior to some further action, as in E. J. Jordan's (U.S. Pat. No. 3,950,252 4/1976 & 4,211,655 7/1980), A. A. Monson's (U.S. Pat. No. 4,162,976 7/1979), and A. W. Green's (U.S. Pat. No. 4,293,421 10/1981).

Aerobic devices, which are more biologically efficient than anaerobic ones and can produce complete treatment, suffer from the requirement of the use of various powered mechanisms to mix effluent with air and as a result are relatively expensive and unreliable, often requiring the use of disinfection which chemically repollutes the treated effluent. When used for sewage treatment, they frequently are not maintained properly releasing a low grade effluent resulting in environmental damage.

This invention, by contrast, advances the technology an order of magnitude by achieving reliable, cheap and complete treatment without mechanical or powered components. It permits higher efficiency, a 4–5 log reduction in sewage fecal coliform bacteria, a 99+% removal of biological oxygen demand and suspended solids, plus substantial reduction in other organic and inorganic solutes. It is driven by a hydraulic static head of but several inches. It can produce limpid, odorless water that can be reused.

This device is inexpensive to install and requires no normal maintenance. It can conveniently be installed under a lawn, building or parking area. It requires no separation from surface water, wells or property lines. Its products can be used for decorating ponds, fountains or irrigation.

SUMMARY OF THE INVENTION

Impure water or sewage released into an ordinary sand filter apparatus will sustain low levels of treatment if the sand medium is coarse and/or cause the filter to clog if it is fine.

The essence of this method is to infuse impure water at extremely low velocities and with a residence time of several days or weeks through a plurality of precisely graded progressively finer pored media, larger interface area and reaction volume, smaller average interstitial distance, and increasingly more intimate contact between biota and pollutants. The complete device collectively then becomes, in effect, a huge beneficial organism consuming sewage and releasing as byproducts pure water plus some natural inocuous gases.

This progressive treatment may be provided most efficiently by constructing the reactor in a cylinder, wedge or cone shape with the largest pored medium at the center or apex where the impure water is introduced. It then seeps radially under slight hydrostatic pressure to the periphery, while being purified.

Incidental and passive contact with ambient air at the surface of the structure will support some aerobic biota by oxygen diffusion which will treat even more efficiently. This can be maximized by shaping the apparatus to provide a large ambient air-effluent interface, while keeping the effluent entirely within the medium.

The effluent can be impounded by creating a precisely shaped and dimensioned chamber lined with impervious, biologically stable material such as concrete, metal, plastic, or to save expense, sculpted out of soil whose particle size is small enough to prevent escape of untreated water, or coarser soil lined with a geomembrane, tight fabric, or very finely pored material such as clay, to isolate effluent from ground water.

Where uphill flow is required by relative elevations, or additional processing capacity is required, pumps and/or optional air-effluent mixers of various types may be used. Ports for effluent sampling and gas escape may extend from each medium layer to the surface for easy access. The top layer of medium can be extended to provide for increased passive air exposure, or a planting area for attractive water-loving plants, exotic landscaping, ponds, falls or fountains.

The influent apex or center section of the impoundment chamber can be expanded to make a flotation separation and sludge storage device to supplement or replace normal septic tank action. The sludge storage chamber can be emptied and physical filtration renewed by back-flushing with treated effluent or other clean water, should it become necessary.

Insulation can be installed around the chambers and a greenhouse or other enclosure over the surface exposure to retain reactor heat for greater reaction velocity.

Medium may be exceptionally well graded gravel and sand for least expense, or any other uniformly porous material possibly made of granular mineral, plastic or metal media or open cell foam plastic or metal. Layers may be separated by fabric or other porous cohesive material to prevent mixing of media.

The number of consecutive layers used, their volume and pore size will vary for each use depending on, among other things, the volume of effluent, the character of the contaminants, the type of media employed and the degree of purification required.

DETAILED DESCRIPTION OF THE DRAWINGS

Figure 1:
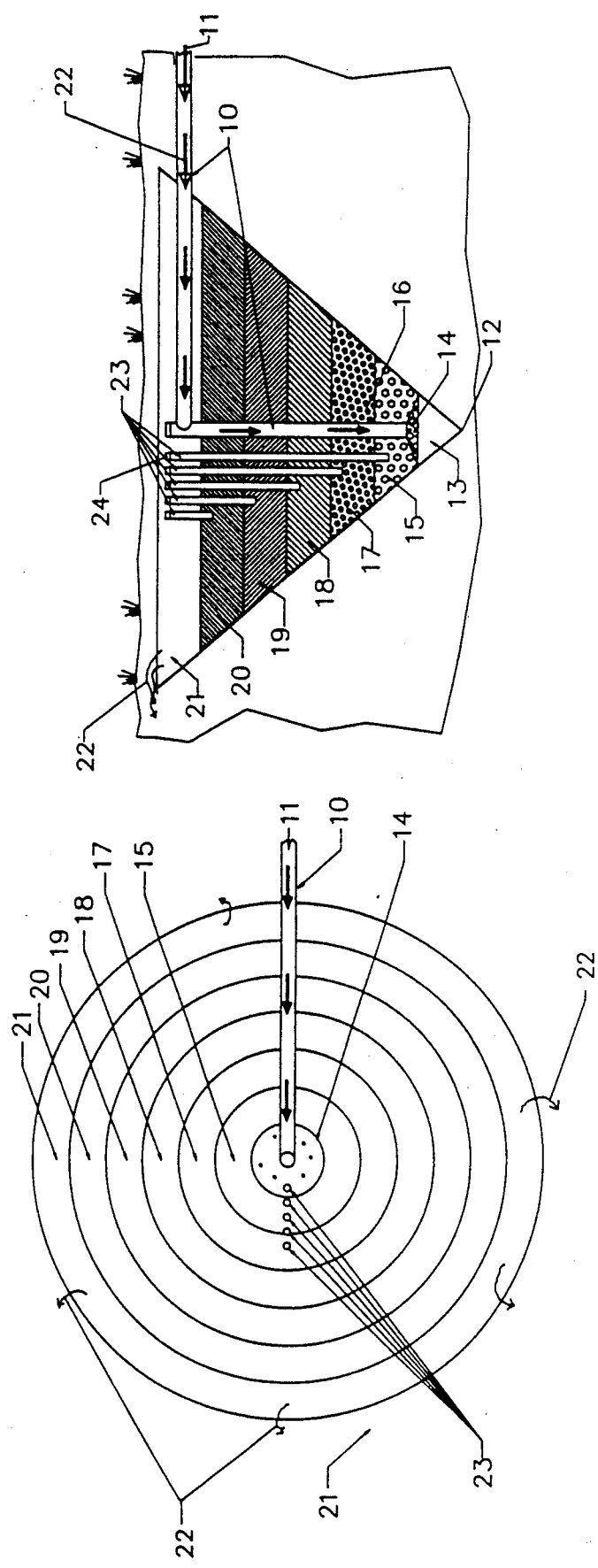
FIG. 1. is a side view of the simplest version of the preferred embodiment, cone or vertical wedge.

In FIG. 1, the influent pipe (10) brings contaminated water (11) from an ordinary septic tank or other source and guides it to the apex of the chamber (12) into the settling chamber (13) which discharges through a perforated separator (14) into the coarsest medium (15), in this case, 2½"×1½" well washed gravel, for further settling and fixed and suspended biotic reaction. It then moves through a porous medium separator (16), in this example 3/16" mesh plastic screen, the metal or plastic mesh is typically similar in pore size to the finer medium (this separator is not essential, but may be helpful depending on the buoyancy and fluidity of the media) into the finer medium (17), in this case, ⅝"×⅜" well washed gravel, where further treatment as in medium (15) occurs, but with greater efficiency and physical filtration of suspended solids. Thence, similarly into medium (18), in this case, washed sand with an effective size of 0.80–2.00 mm and a uniformity coefficient of $\leq 1.5$ repeating the progressive purification until arriving at medium (19), in this example, washed sand with an effective size of 0.50–0.60 mm and a uniformity coefficient of $\leq 1.6$ to the final medium (20), in this case, sand with an effective size of 0.35–0.45 mm and a uniformity coefficient of $\leq 1.2$ shown, in this case, buried in native top soil (21) sufficiently hydraulically conductive to permit unconfined radial gravity flow to disperse the purified water (22) into local shallow ground water. Sampling and gas escape ports (23) are run from the medium layer to the surface. An optional air injection (24) may be used to aerate the effluent (25).

Figure 2:
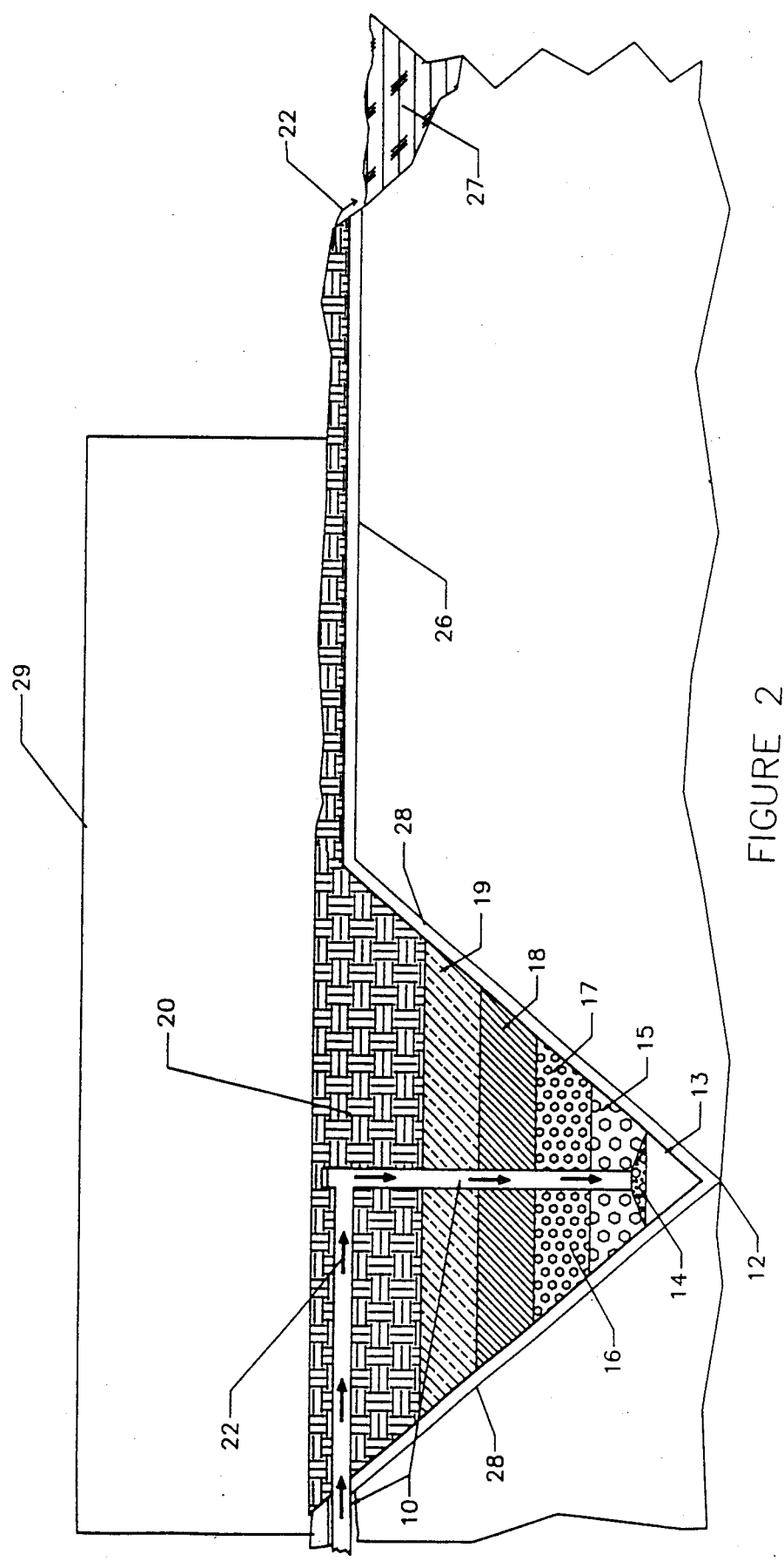
FIG. 2. is an overhead view of the simplest version of the preferred embodiment with cone shape.

In FIG. 2., the influent (11) enters the settling chamber from the influent pipe (10) then through the perforated plate (14) into the first layer (15) flowing radially, axially and upward through the conic (in this case) chamber over the upper peripheral edge of the cone into the environment (13).

Figure 3:
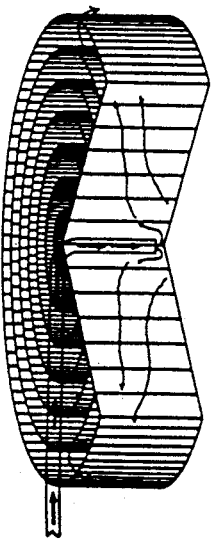
FIG. 3. is a side view showing an extended final phase to confine direct purified effluent to a specific disposal area such as a ditch, drain, surface water, etc.

In FIG. 3., the hydraulic flow and purification principles are the same as in FIGS. 1 and 2, except that the flow is retained after purification by constructing an impermeably lined channel (26) to confine and guide the product through a permeable medium (20) into a specific disposal or reuse area (27). This channel can provide extra aeration, landscaping irrigation, as well as transportation. Insulation (28) and housing (29) can thermally isolate the chamber.

Figure 4:
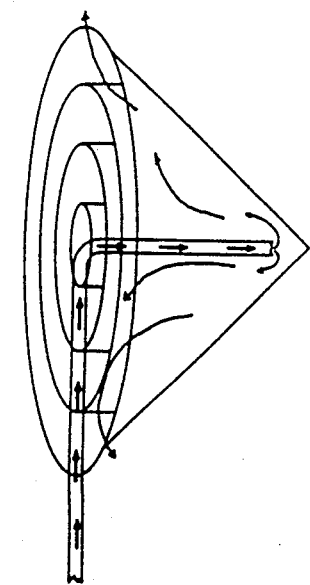
FIG. 4. is a perspective view of some examples of general chamber shapes to illustrate some variations.

In FIG. 4. are perspective views of some typical chamber shapes and flows that can be used alone or in series.

Figure 5:
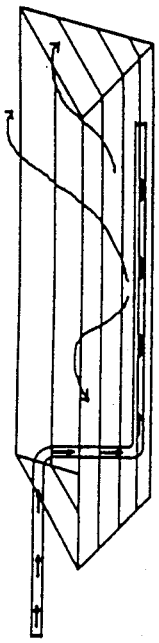
FIG. 5. is an overhead view of a separated monomedium bed series.
Figure 6:
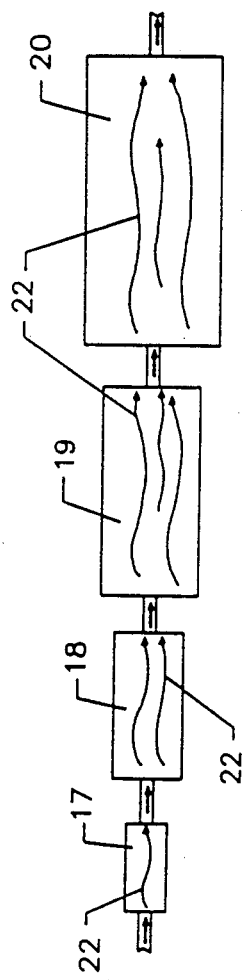
FIG. 6. is an overhead view of a separated monomedium bed series.

In FIG. 5. is an overhead view of the specified principle being executed with discrete monomedium beds or chambers as phases, interconnected by plumbing or other connections.

Especially selected biota may be used to innoculate the media and/or special nutrients may be added to increase treatment efficiency. Catalytic media may be used to accelerate chemical reactions.

The preferred embodiments and uses are described above for illustrative purposes. It is to be understood that variations and modifications or other uses lie within the scope of the claims below.

We claim:

1. An apparatus for biological purification of sewage or water comprising:
    a plurality of layers of media, comprising means for support of biota, said layers of media being contained in a relatively water impermeable chamber means, and being progressively graded from a first, coarsest layer to a final, finest layer, and said layers progressively increasing in volume from said first layer to said final layer;
    influent means for introducing sewage or water to be treated into said first layer; and
    effluent means for removing treated effluent from said final layer;
    wherein said plurality of layers of media are constructed and arranged to provide passive ambient air contact at an upper surface of said layers and to provide a residence time for the water or sewage being treated of several days or weeks.
2. The apparatus in claim 1 whereby said chamber means is shaped approximately as a cylinder, cylinder section, cone, or wedge with the influent means entering said chamber at the center or apex directly into the coarsest medium layer and flowing peripherally through said progressively finer pored layers with each layer interface area thus made progressively larger.
3. The apparatus of claim 1 further comprising pipe means for sampling of gas escape embedded in said media.
4. The apparatus of claim 1 wherein the upper surface is extended horizontally in passive contact with ambient air to provide directional channeling of effluent and extra aerobic reaction.
5. The apparatus of claim 1 wherein said chamber means comprises a plurality of discrete chambers connected together in series with each chamber containing progressively finer media.
6. The apparatus of claim 1 wherein insulation or a housing is placed around said chamber to conserve internal heat.
7. The apparatus of claim 1 wherein said chamber means comprises a single chamber constructed of sculpted soil lined with an impermeable membrane, tight fabric, clay or other impermeable soil layer.
8. The apparatus of claim 1 wherein some or all of the media are composed of open celled foam plastic, metal, or gravel and sand.
9. The apparatus of claim 2 further comprising porous media separators at each layer interface area.
10. A process for biological purification of sewage or water comprising:
    providing biota supported on a plurality of layers of media contained in a relatively water impermeable chamber means, said media being progressively graded from a first, coarsest layer to a final, finest layer, and said layers progressively increasing in volume from said first layer to said final layer;
    introducing sewage or water to be treated into said first layer;
    passing said sewage or water to be treated through each of said progressively graded layers over a residence time of several days or weeks, while providing passive ambient air contact with an upper surface of said layers; and
    withdrawing treated effluent from said final layer.

* * * * *